United States Patent Office 3,520,970
Patented July 21, 1970

3,520,970
SOLID ORAL DRUG MEDICAMENT COATED FOR RAPID OR GRADUAL RELEASE WITH COPOLYMERS OF POLYMERIZABLE QUATERNARY AMMONIUM MONOMERS AND WATER-INSOLUBLE HOMOPOLYMER-FORMING MONOMERS
Klaus Lehmann, Darmstadt, Gerhard Markert, Upper Ramstadt-Eiche, and Gerhart W. E. Rothgang, Darmstadt, Germany, assignors to Rohm & Haas G.m.b.H., Darmstadt, Germany
No Drawing. Filed Aug. 2, 1967, Ser. No. 657,763
Claims priority, application Germany, Aug. 12, 1966, R 43,904
Int. Cl. A61k 27/12
U.S. Cl. 424—25                  5 Claims

ABSTRACT OF THE DISCLOSURE

Coated orally ingestible medicament, method of coating, and products for coating a medicament with a copolymer of (I) a monomer forming a water-insoluble homopolymer (e.g. alkyl acrylates and methacrylates), and (II) a polymerizable quaternary ammonium compound (e.g. alkylated aminoesters and aminoamides of acrylic and methacrylic acids). Coatings may be prepared having widely different solubilities and permeabilities, but all dissolve independently of their physiological pH environment.

---

The present invention relates to methods and materials useful for coating pharmaceutical products with coatings having a solubility and permeability independent of physiological pH values, and to pharmaceutical products so coated. In particular, the invention relates to the coating of a physiologically effective material with a material whose solubility or permeability can have a desired predetermined value.

Coatings for tablets, dragees, granules, and the like are being prepared in increasing numbers from synthetic polymers because these materials, in contrast to the natural substances earlier used, permit the solubility properties of the coating to be chosen at a desired value. For example, German patent publications 859,931 and 1,090,-381 disclose tablet coatings prepared from acrylic resins containing acidic or basic groups. Tablet coatings having basic groups in the polymeric resin dissolve in the stomach juices and there liberate the enclosed effective ingredient, whereas acidic groups make the coating resistant to stomach juices and first permit solution in the alkaline environment of the inestinal juices.

Nevertheless, it is often desired to predetermine not the site in the organism where decomposition of a tablet coating occurs, but the period of time until the coating disintegrates or the duration of the release of the effective ingredient, without regard to the changing pH conditions occurring during passage through the digestive tract. It is often desired to have a coating merely thick enough to mask taste for carrying a pharmaceutical agent until the material is in the stomach, without also incurring the numerous disadvantages of sugar coating. The results of prior attempts to influence the rate of solubility of tablet coatings by means of a special structure or a specific composition have not been satisfactory. The numerous proposed heterogeneous mixtures of natural and synthetic, water-soluble and water-insoluble coating materials require coating techniques worked out specially for each individual case, since otherwise a uniformly reproducible formation of the tablet coating is not possible. Further, these mixtures dissolve at a rate dependent upon the pH value of the dissolving medium if natural materials or polymers having acidic or basic groups are employed therein. The rate of solution of such coatings for the most part can be varied only within very narrow limits. The majority of the proposed mixtures could not be successful for the reasons that the conflicting influences of the numerous components of the tablet coating, of the effective ingredient enclosed therein, and of the components of body fluids are difficult to perceive and because extensive development work would be necessary in each individual case.

According to the present invention, coating materials have been found which permit the preparation of coatings which have a solubility, or permeability for the material coated, which are variable within wide limits. These coating solutions contain, in an organic solvent, soluble copolymers comprising: (I) at least one ethylenically unsaturated monomer forming a water-insoluble homopolymer and (II) at least one polymerizable quaternary ammonium compound. The monomers (I) and (II) are present in the copolymers in a weight ratio between 5:95 and 95:5.

As the polymerizable quaternary ammonium compounds, quaternized aminoalkyl esters and aminoalkyl amides of acrylic acid and methacrylic acid are of principal importance, for example β-methacryl-oxyethyl-trimethyl-ammonium methosulfate, β-acryloxy-propyl-trimethyl-ammonium chloride, and trimethylaminomethyl-methacrylamide methosulfate. The quartenary ammonium atom can also be part of a heterocycle, as in methacryloxyethylmethyl-morpholinium chloride or the corresponding piperidinium salt, or it can be joined to an acrylic acid group or a methacrylic acid group by way of a group containing hetero atoms, such as a polyglycol ether group. Further suitable polymerizable quaternary ammonium compounds include quaternized vinyl-substituted nitrogen heterocycles such as methyl-vinyl pyridinium salts, vinyl esters of quaternized amino carboxylic acids, styryltrialkyl ammonium salts, and the like.

The quaternary ammonium compounds are strong bases which, therefore, are present as stable salts within the entire physiological pH region, and easily water-soluble. The advantageous properties of the polymeric coating materials of the invention stem from the fact that the rate of solution of such coatings, or the permeability of the coatings to an enclosed effective ingredient, can be proportionately decreased by inclusion in the polymer structure of monomers which, if polymerized alone, would give a water-insoluble homopolymer. Such monomers include, for example, the esters of acrylic acid and methacrylic acid, styrene and its homologs, vinyl esters such as vinyl acetate, and vinyl chloride. The rate of solution of the polymers in water is significantly decreased by the introduction of even 10 weight percent of a hydrophobic monomer therein. At a content of hydrophobic monomer between 80 and 95 percent, the copolymers of the invention are only swellable in water.

The solubility properties of the copolymers can be further modified by the inclusion therein of other hydrophilic monomers, providing that their solubility is not dependent on pH. The best known monomers of this kind are acrylamide and methacrylamide, hydroxy alkyl esters of acrylic acid and methacrylic acid, and vinyl pyrrolidone. These materials are entirely optional and, if used, are used in small amounts up to 20 percent by weight of the copolymer.

The rate of solubility of tablet coatings prepared from the copolymeric materials of the present invention is practically independent of the pH values prevalent in different portions of the digestive tract. By altering the proportion of quaternary ammonium compound in the copolymers, the solubility properties of the copolymers can be varied over a wide region. Coatings having a high proportion of quaternary groups dissolve within a few minutes. With decreasing proportion of these groups, the rate of solution decreases until a condition is reached in which the coating dissolves hardly at all, but only becomes permeable to water on swelling and gradually releases the enclosed effective ingredient by diffusion.

From a practical viewpoint, it is not necessary to have a special copolymer at hand for each coating having a desired solution rate. Rather, it is suitable to have a small number of polymers having different proportions of quaternary amine therein. The tolerance of these polymers for each other is assured because of their similar structures, so that any desired value of solubility rate or swellability can be obtained by the mixing of two or more polymers.

The polymers according to the present invention are easily soluble in organic solvents such as alcohols, ketones, esters, halohydrocarbons, or mixtures thereof. Copolymers comprising a large fraction of quaternary ammonium compounds are water-soluble. For tablet coating, about 10–20 percent solutions are preferably used. Of the solvents, isopropyl alcohol, ethyl alcohol, and methylene chloride or their mixtures are preferred. The amount of solution used depends on the surface to be coated and on the polymer content of the solution. 10 milligrams of a coating solution of the concentration mentioned above per square centimeter of tablet surface area generally give a film of sufficient strength and thickness.

The polymers contained in the coating solutions according to the present invention can be prepared as solution polymers in the solvent in which they are employed. Although by this process the finished coating solution is obtained in a single step, it is generally preferred in practice to prepare the polymer as a precipitation or bulk polymer in solid form and to dissolve it in a suitable solvent, optionally after subdivision. The preparation of the polymer, as well as the preparation of coating solutions therefrom, are according to prior art methods and are not part of the present invention.

The coating materials of the invention can contain the conventional fillers and coloring agents. They are also suitable for the coating of granules or as an auxiliary granulating agent. Medicaments can either simply be coated with the coating materials according to the invention, or individual layers of medicament can be laid down before, after, or between, conventional coating layers.

A better understanding of the present invention and of its many advantages will be had by referring to the following examples, given by a way of illustration.

EXAMPLE 1

Glucose tablets were coated in a coating kettle with a 15 percent solution of a copolymer comprising 24 percent by weight of trimethyl-methacryloxyethyl-ammonium chloride, 56 percent by weight of methyl methacrylate, and 20 percent by weight of ethyl acrylate in a mixture of isopropyl alcohol and methylene chloride. About 10 milligrams of solution were used per square centimeter of tablet surface area. A coherent film about 10 microns thick was produced.

The tablets dissolved in water at 37° C. in about 3 to 5 minutes. In synthetic digestive juices having a pH of 2 (stomach juices), and pH's of 5 to 8 (intestinal juices), the same decomposition time was measured.

EXAMPLE 2

A copolymer comprising 10 percent by weight of tri-methyl-methacryloxyethyl-ammonium chloride, 60 percent by weight of methyl methacrylate, and 30 percent by weight of ethyl acrylate was used to coat glucose tablets as in Example 1 from a 15 percent solution in isopropyl alcohol/methylene chloride.

In water at 37° C., the tablet coating swelled, but did not dissolve. The amount of glucose released from the tablet interior by diffusion increased steadily and amounted to 80 percent of the amount originally within the tablet core after 120 minutes.

EXAMPLE 3

Glucose tablets were coated according to the method of Example 1 with a mixture of equal parts of the solutions described in Examples 1 and 2.

The tablet coating dissolved slowly in water at 37° C. and released over 80 percent of the enclosed quantity of glucose within 20 minutes.

EXAMPLE 4

A 15 percent solution of a copolymer comprising 10 percent by weight of trimethyl-methacryloxyethyl-ammonium chloride, 60 percent by weight of methyl methacrylate, and 30 percent by weight of ethyl acrylate in a mixture of isopropylalcohol and methylene chloride (solution A) and a second 15 percent solution of a coplymer comprising 5 percent by weight of trimethyl-methacryloxyethyl-ammonium chloride, 65 percent by weight of methyl methacrylate, and 30 percent by weight of ethyl acrylate in the same solvent mixture (solution B) were mixed in various ratios, given in Table I. 500 g. tablets, containing 56 mg. difenidolum hydrochloride per tablet, were coated by application of 150 g. of the mixed polymer solutions, to obtain water-insoluble coatings of different release rates. The lacquer was applied in about 40 portions to the tablets, rotating in a coating kettle into which air was blown to dry the film layers. A coherent film about 30 microns thick was produced. In a disintegration apparatus, as described in USP XIV, the coated tablets were tested in water for drug release, measuring the absorbance of the test solution at 254 nm.

Table I shows the observed drug release in percent at various time intervals, using various coating mixtures of the above-mentioned polymer solutions A and B.

TABLE I

| | Percent release of difenidolum with various coating mixtures | | | |
|---|---|---|---|---|
| | Solution A | 50% Sol. A 50% Sol. B | 45% Sol. A 55% Sol. B | 40% Sol. A 60% Sol. B |
| Time, hours: | | | | |
| 2 | 54 | 20 | 14 | 6 |
| 4 | 100 | 46 | 30 | 15 |
| 6 | | 77 | 48 | 22 |
| 8 | | 95 | 71 | 28 |

EXAMPLE 5

200 g. of granules (0.8–1.2 mm. diameter) containing 3.5 mg. of trifluoperazine per gram were coated with the polymer solutions A and B, described in Example 4, or with a mixture of both solutions at equal parts, respectively. To the granules, rotating in a coating kettle, 300 g. of the polymer solutions were applied by spraying with a spraying-gun and compressed air, producing a coherent film about 30 microns thick.

Table II shows at various time intervals the observed drug release in percent in an USP XIV disintegration apparatus. Trifluoperazine was estimated by measuring the absorbance at 254 nm.

TABLE II

| | Percent release of trifluoperazin with various coatings | | |
|---|---|---|---|
| | Solution A | 50% Solution A 50% Solution B | Solution B |
| Time, hours: | | | |
| ½ | 91 | 56 | 14 |
| 1 | 100 | 86 | 29 |
| 2 | | 98 | 44 |
| 4 | | 100 | 57 |
| 6 | | | 65 |

EXAMPLE 6

A 15 percent by weight solution of a copolymer compring 58 percent by weight styrene, 35 percent by weight dibutyl itaconate, and 7 percent by weight 1,2-dimethyl- 5-vinyl-pyridinium methosulfate in a solvent mixture of isopropylalcohol and acetone was not used to coat glucose tablets as in Example 1.

In water at 37° C., the tablet coating dissolved slowly and released over 80 percent of the enclosed quantity of glucose within 30 minutes. Powdered or granulated pharmaceutical products, provided with a coating according to the invention may further be used to press tablets or to fill them into capsules, e.g. of gelatine, which are soluble in digestive juice.

What is claimed is:

1. A medicament consisting essentially of an orally ingestible solid drug ingredient and a coating thereover comprising a copolymer, or a mixture of copolymers, of (I) at least one monomer forming a water-insoluble homopolymer and selected from the group consisting of lower alkyl acrylates and methacrylates, styrene, vinyl chloride, and vinyl esters of lower alkyl carboxylic acids, and (II) at least one monomer which is a polymerizable quaternary ammonium compound selected from the group consisting of quaternized aminoalkyl and aminocycloalkyl esters of acrylic acid or methacrylic acid, quaternized aminoalkyl and aminocycloalkyl amides of acrylic acid or methacrylic acid, quaternized esters and amides formed between amino polyglycol ethers and acrylic acid or methacrylic acid, quaternized vinyl-substituted nitrogen heterocycles, vinyl esters of quaternized amino carboxylic acids, and styryl-trialkyl ammonium salts, in which copolymer or copolymers the ratio by weight of components (I) and (II) is between 5:95 and 95:5, said coating having a pre-selected solubility rate varying with the proportion of quaternary groups therein from pre-selected coatings dissolving within a few minutes and having a high proportion of quaternary groups to pre-selected coatings having a low proportion of quaternary groups and dissolving hardly at all but only becoming permeable to water on swelling and thereby gradually releasing the enclosed drum ingredient by diffusion, with any desired intermediate value of solubility rate or swellability being obtained from a copolymer or mixture of copolymers having an intermediate proportion of quaternary amine groups therein.

2. A medicament as in claim 1 wherein said orally ingestible drug ingredient is in the form of a tablet.

3. A medicament as in claim 1 wherein said orally ingestible drug ingredient is in the form of a powder or granules and said coated powder or granules are pressed into a tablet.

4. A medicament as in claim 1 wherein said coated powder or granules are present within a capsule soluble in digestive juices.

5. A medicament consisting essentially of an orally ingestible solid drug ingredient and a coating thereover comprising a copolymer, or a mixture of copolymers, of (I) at least one monomer forming a water-insoluble homopolymer and selected from the group consisting of lower alkyl acrylates and methacrylates, styrene, vinyl chloride, and vinyl esters of lower alkyl carboxylic acids, and (II) at least one monomer selected from the group consisting of quaternized esters and amides formed between acrylic acid or methacrylic acid and lower aminoalkanols, lower alkyl diamines, N-alkyl morpholine, or N-alkyl piperidine, in which copolymer or copolymers the ratio by weight of components (I) and (II) is between 5:95 and 95:5, said coating having a pre-selected solubility rate varying with the proportion of quaternary groups therein from pre-selected coatings dissolving within a few minutes and having a high proportion of quaternary groups to pre-selected coatings having a low proportion of quaternary groups and dissolving hardly at all but only becoming permeable to water on swelling thereby gradually releasing the enclosed drug ingredient by diffusion, with any desired intermediate value of solubility rate or swellability being obtained from a copolymer or mixture of copolymers having an intermediate proportion of quaternary amine groups therein.

References Cited

UNITED STATES PATENTS

| 2,980,634 | 4/1961 | Melamed | 424—78 XR |
| 2,984,639 | 5/1961 | Stamberger et al. | 424—81 XR |
| 2,990,332 | 6/1961 | Keating | 424—79 |
| 3,091,574 | 5/1963 | Coletta et al. | 424—79 |
| 3,092,547 | 6/1963 | Coker et al. | 424—329 |
| 3,121,043 | 2/1964 | Tobin et al. | 424—79 XR |
| 3,158,538 | 11/1964 | Lee | 424—79 |
| 3,308,020 | 3/1967 | Wolf et al. | 424—78 |
| 3,325,365 | 6/1967 | Hotko et al. | 423—33 |
| 3,336,196 | 8/1967 | McGregor | 424—329 XR |

SHEP K. ROSE, Primary Examiner

U.S. Cl. X.R.

260—78, 79.7, 80.72, 80.73, 80.81, 86.1, 86.3, 86.9, 87.1 87.3, 87.5, 88.1